(12) United States Patent
Fong et al.

(10) Patent No.: US 8,190,459 B1
(45) Date of Patent: May 29, 2012

(54) CUSTOMIZABLE WORKFLOW REPORTER (75) Inventors: Wai Kit Fong, Olathe, KS (US); Naresh Saladi, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1362 days.

(21) Appl. No.: 10/881,385

(22) Filed: Jun. 30, 2004

(51) Int. Cl.
*G06Q 10/00* (2006.01)
(52) U.S. Cl. .................................................... 705/7.11
(58) Field of Classification Search ............ 707/103 R, 707/4; 705/2, 301
See application file for complete search history.

(56) References Cited

U.S. PATENT DOCUMENTS

| | | | | |
|---|---|---|---|---|
| 6,321,133 | B1 * | 11/2001 | Smirnov et al. | 700/100 |
| 6,539,396 | B1 * | 3/2003 | Bowman-Amuah | 707/769 |
| 6,763,353 | B2 * | 7/2004 | Li et al. | 719/320 |
| 6,850,530 | B1 * | 2/2005 | Waclawsky et al. | 370/401 |
| 7,054,823 | B1 * | 5/2006 | Briegs et al. | 705/2 |
| 7,979,297 | B1 * | 7/2011 | Shivananda et al. | 705/7.27 |
| 2006/0167703 | A1 * | 7/2006 | Yakov | 705/1 |

OTHER PUBLICATIONS

Vitria Business Cockpit Brochure, 2001, 4 pgs.
Vitria Communicator Data Sheet, 2001, 5 pgs.
Vitria Communicator Product Brief, 2001, 16 pgs.
Vitria Architecture Overview, May 22, 2002, 23 pgs.
Shivananda, Sunitha, et al., *Order Tracking and Reporting Tool*, Filing Date—Oct. 16, 2002, U.S. Appl. No. 10/272,423, Specification (23 pgs.), Drawings (21 sheets),.

* cited by examiner

*Primary Examiner* — Romain Jeanty
*Assistant Examiner* — Luis Santiago
(74) *Attorney, Agent, or Firm* — Swanson & Bratschun, L.L.C.

(57) ABSTRACT

A workflow management system is provided. The workflow management system comprises a workflow manager that coordinates the activities of business systems to accomplish jobs, the workflow manager associating a state with each job and updating the state of each job as the job progresses, a tracking data store, and a reporting data store. The tracking data store receives the state of the jobs from the workflow manager. The reporting data store receives the state of the jobs from the tracking data store. The reporting data store maintains milestones which correspond to one or more states, and scenarios, which are defined as a group of milestones. The system also includes a processing component that analyzes the plurality of milestones and scenarios to provide a summary of job progress. The system also includes a user interface operable to select and to display a report of job progress.

12 Claims, 7 Drawing Sheets

CUSTOMIZABLE WORKFLOW REPORTER

CROSS-REFERENCE TO RELATED APPLICATIONS

This application contains subject matter related to U.S. patent application Ser. No. 10/272,423, filed Oct. 16, 2002, entitled "Order tracking and reporting tool," invented by Sunitha Shivananda, et al, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to improvements in information technology.

The present disclosure relates to a method and related system for tracking, archiving, and reporting information related to a business workflow, and more particularly, but not by way of limitation, to a system and method for generating a customizable workflow report.

BACKGROUND OF THE INVENTION

A workflow is a largely automated set of relationships between tasks related to the completion of a business process object from start to finish. A business process object or job is a single instance of a business process (e.g., a customer's order for a product or service). Tasks may be triggered by automated messages or, alternately, by manual interaction. Workflow management, which relates to the coordination of business tasks, or processes, is an emerging technology closely associated with corporate streamlining activities. Fundamentally, it is an information technology model for reducing business costs, improving efficiency, and facilitating an adaptive business organization.

In a workflow, business processes (e.g., order processing, product delivery scheduling) are generally defined in such a way that they can be directly interpreted and executed by a workflow manager, which can take the form of one or more central servers. A major inhibitor to the development of workflow is understanding the mechanisms, interactions, and inter-relationships of these tasks, as even small businesses may develop hundreds of such tasks as a workflow matures.

Many customer-oriented businesses rely on largely automated procedures for receiving, tracking, and completing a customer order. With large businesses processing hundreds of thousands of orders per month, it is vital to ensure that orders are processed efficiently in order to preserve customer satisfaction. Tracking and reporting data ensures that orders are not accumulating at any one step without any forward progress through the workflow. Identifying congested workflow states, or bottlenecks, that block the forward progress of other orders is important to recognizing workflow areas that need increased headcount or computing capacity. For example, if it is determined that many orders are being received for new telephone service, but only a small percentage are being queued for implementation, steps can be taken to proactively improve order fulfillment. As it would be time-consuming to monitor the status of each individual order, it is desirable to track and archive data that can be analyzed for trends or bottlenecks.

A key to maintaining customer satisfaction is the ability to query the real-time status of any order and identify its present state within the workflow, so that the status may be reported to the customer on demand. It is also desirable to be able to research all orders for a particular customer, across all processes within the workflow. It is also desirable to record the time it takes for an order to transition from state to state within the workflow. In addition to providing data to analyze for process optimization, historical data could also contribute to more accurate business forecasting by assisting in predicting future peak order periods, for example, so that they may be adequately prepared for. Collecting real-time data as well as historical data may be complicated by the existence of data on multiple systems with differing architectures. Historically, there has been no systematic, efficient way to access the level of order information desired across a multitude of legacy systems. The ability to generate reports on demand, as well as customized reports detailing specific parameters, is also desirable. Many conventional order tracking and reporting data stores generate periodic planned reports, but it is further desired to generate customized, ad hoc reports.

SUMMARY OF THE INVENTION

A workflow management system is provided. The workflow management system comprises a workflow manager that coordinates the activities of business systems to accomplish jobs, the workflow manager associating a state with each job and updating the state of each job as the job progresses, a tracking data store, and a reporting data store. The tracking data store receives the state of the jobs from the workflow manager. The reporting data store receives the state of the jobs from the tracking data store. The reporting data store maintains milestones which correspond to one or more states, and scenarios, which are defined as a group of milestones. The system also includes a processing component that analyzes the plurality of milestones and scenarios to provide a summary of job progress. The system also includes a user interface operable to select and to display a report of job progress.

A method of analyzing a workflow is also provided. The method comprises collecting state information about jobs progressing through a workflow, storing milestone definitions, where each milestone is defined as one or more job states, generating a summary of the state information based on the milestone definitions, and displaying the summary.

A method of monitoring a workflow is also provided. The method comprises collecting state information, each state associated with an order progressing through a workflow managed by a workflow manager. The method includes storing the state information in a tracking data store and copying the state information to a reporting data store. The method provides for storing milestone definitions in the reporting data store, generating a summary of the state information based on the milestone definitions, and storing scenario definitions in the reporting data store. The method includes generating a report based on a selected scenario, displaying the report based on the selected scenario, changing one of the scenario definitions, and redisplaying the report based on the selected scenario definition. The milestone definitions identify one or more states. The scenario definitions identify an ordered group of milestones.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The preferred embodiments of the present invention disclose a method and related system for customizing a report summarizing the status of a plurality of business process objects (hereinafter, "orders") within a business workflow. The preferred embodiments enable a user to quickly customize the report by editing data in data store tables, thereby changing how data is summarized for the report. Order processing is generally coordinated between several systems by a central workflow manager. Generally, a central workflow manager acts as a central clearinghouse to coordinate messages between numerous individual systems. The workflow manager is linked with each system by one or more "channels," which are communications pathways for delivering queued event-based messages between the workflow manager and each system, as well as between different processes within the workflow manager. Typically, the workflow manager places an event into a channel, where the event remains until it is retrieved by the target system. The event may have an expiration period, so that it is not enacted if it is not retrieved before a deadline, or may alternately be a guaranteed delivery event, which does not expire.

After retrieving and acting on an event, a system may insert another event designated for the workflow manager into a return channel. Once the event is retrieved by the workflow manager, the workflow manager may recognize that a certain task has been performed. The workflow manager then addresses the next task in the workflow by placing a subsequent event designated for the next targeted system. Events may pass to or from the workflow manager, depending on the system for which they are targeted. Essentially, the workflow manager follows a set procedure for notifying various systems of tasks to be performed, receiving confirmation that the events reached their destinations, and following up with subsequent tasks. The workflow manager may process hundreds of thousands of orders per month, each order being sequenced through possibly hundreds of distinct tasks, stages, or states.

Figure 1:
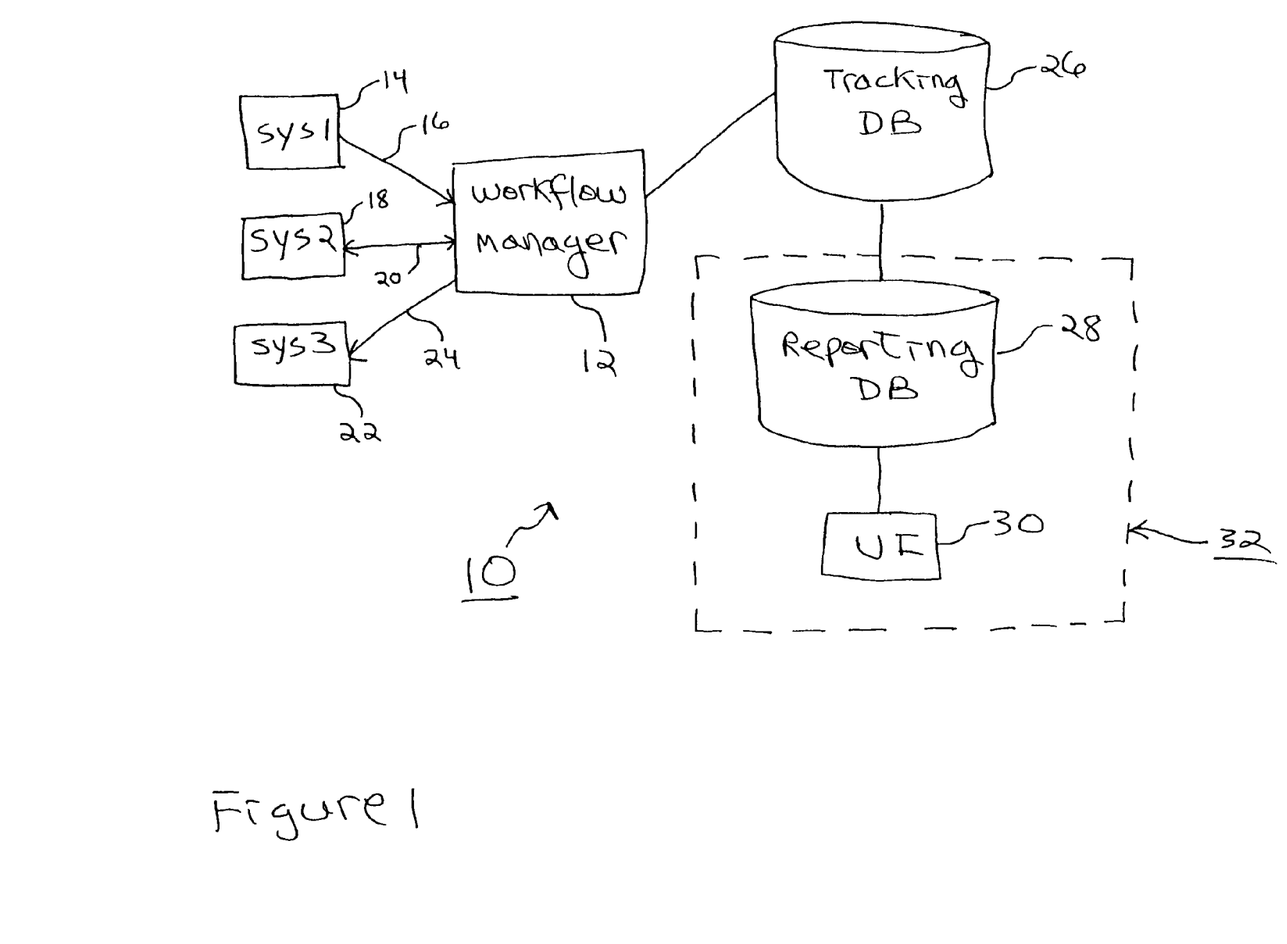
FIG. 1 is a block diagram of a system for implementing a customizable workflow reporter according to one embodiment.

Turning now to FIG. 1, a block diagram of a system 10 suitable for implementing the present embodiments is depicted. A workflow manager 12 includes one or more servers that receive and send out event-based messages or "events," to communicate between internal processes and a multitude of linked systems. Events are associated with transitions of a customer order from one workflow state to another, marking the progress of the order through the workflow. In the setup shown in FIG. 1, a task such as entering a new order may be performed by a first system 14. An event may then be placed into a first channel 16 on the workflow manager 12. The event may remain in the first channel 16 for a period of time until it is retrieved by the workflow manager 12 or it expires. The workflow manager 12 is also in communication with a second system 18 using a second channel 20 and with a third system 22 using a third channel 22. It will be understood that arrows 16, 20, and 24 represent channels and not necessarily physical connections. In the preferred embodiment, the workflow manager 12 is a Vitria Workflow Manager. The workflow manager 12, the first system 14, the second system 18, and the third system 22 each may execute on a general purpose computer system. General purpose computer systems will be discussed in greater detail hereinafter.

The event in the channel 16 is typically retrieved by the workflow manager 12, which then recognizes that a certain task has been performed and that a subsequent action (e.g., product shipping) needs to be taken. Assuming that the second system 18 handles tasks associated with product shipping, an event might be placed into channel 20, where it is retrieved by the second system 18. This event may trigger an action at the second system 18, such as a product shipping procedure. The second system 18 may then recognize that it must confirm completion of this action in order for the next step in the workflow to take place, and consequently places a subsequent event, such as "shipped today," into the second channel 20. Once retrieved by the workflow manager 12, a follow-up event, such as "order completed," may then be placed into the third channel 24 by the workflow manager 12. The third system 22 may then retrieve the follow-up event and perform an associated task (e.g., billing).

As the workflow manager 12 processes events and manages tasks it deposits order state information into a tracking data store 26. The data in the tracking data store 26 tracks the state and condition of the numerous orders in the system 10 in real-time or near real-time in the present embodiment. A reporting data store 28 is in communication with the tracking data store 26. The reporting data store 28 is periodically refreshed with copies of the information on the orders and stores this information indefinitely. The reporting data store 28 supports analyzing order histories, analyzing processing trends, and generating reports based on the state information deposited into the reporting data store 28. A user interface (UI) 30 provides control inputs to the reporting data store 28 to cause reports to be generated. The UI 30 also displays the report information. The reporting data store 28 and the UI 30 collectively form a customizable workflow reporter 32. In the preferred embodiment, the tracking data store 26 and the reporting data store 28 are MOCHA data stores. The tracking data store 26 and the reporting data store 28 each may execute on a general purpose computer system.

The reporting data store 28 may sync with tracking data store 26 for example every 24 hours. The reporting data store 28 has PUSQL and other stored procedures which may be initiated or triggered, for example, by tasks such as identifying changed records for orders between the reporting and tracking data stores 28 and 26, respectively; deleting all matching records from the reporting data store 28; and adding new order milestone information including old orders along with new orders.

Figure 2:
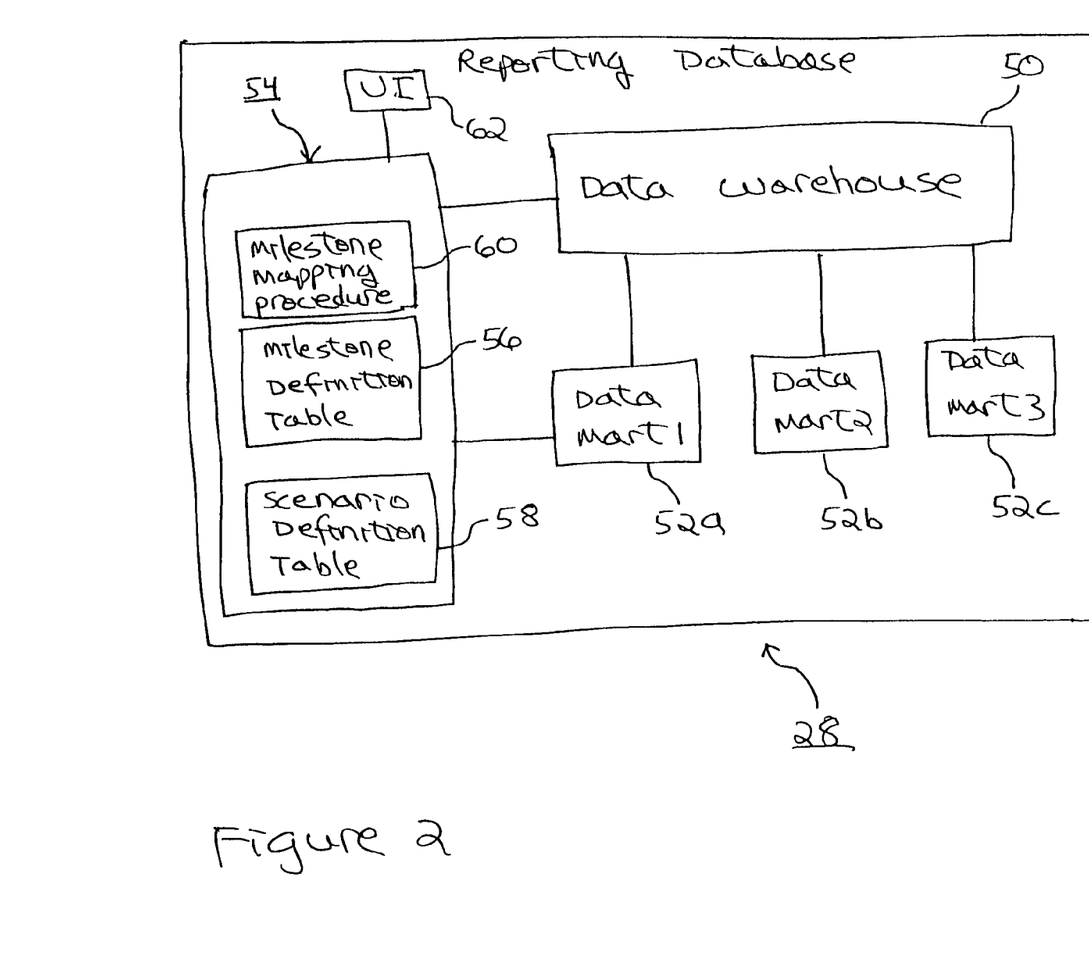
FIG. 2 is a block diagram of a reporting data store according to one embodiment.

Turning now to FIG. 2, a block diagram provides internal details of the reporting data store 28. The data received from the tracking data store 26 is stored in a data warehouse 50. This data is preprocessed and placed into a plurality of datamarts 52—a first datamart 52a, a second datamart 52b, and a third datamart 52c. The datamarts 52 contain preprocessed data amenable to retrieval by the user interface 30 for display.

Preprocessing procedures may form a component of each datamart 52 or may be separate components within the reporting data store 28. Preprocessing procedures may also be components external to the reporting data store 28 and may interwork with the reporting data store 28 to provide preprocessed information to the datamarts 52. A scenario preprocessor 54 for generating data to the first datamart 52a is depicted as separate from the first datamart 52a, but other configurations may be employed in alternate embodiments. The scenario preprocessor 54, for example, in another embodiment may be a component of the first datamart 52a. In another embodiment, the scenario preprocessor 54 may be a component external to the reporting data store 28 and may interwork with the reporting data store 28 to provide preprocessed information to the first datamart 52a.

The scenario preprocessor 54 includes a milestone definition data store table (MDDT) 56, a scenario definition data store table (SDDT) 58, one or more milestone mapping procedures 60, and a scenario preprocessor user interface (UI) 62. The MDDT 56 comprises a plurality of entries, records, or rows each of which contains the definition of a milestone. The milestone is the abstract representation of one or more job states or stages. The milestone may organize a plurality of job states or stages into a unity which is more meaningful to an analyst or operator than the uncollected plurality of job states or stages. The definition or details of the milestone may include a milestone name, a from-state identification, and a to-state identification. The milestone is considered to subsume within it all the consecutive states between the from-state and the to-state as well as the from-state and the to-state. For example, suppose a job comprises 100 consecutively ordered states or stages named state 1, state 2, through state 100. Suppose a milestone C has a from-state identification of state 20 and a to-state identification of state 23. Then, the milestone C subsumes within it state 20, state 21, state 22, and state 23. Any job processing instance which is in state 20, state 21, state 22, or state 23 is said to be in the milestone C.

Figure 3:
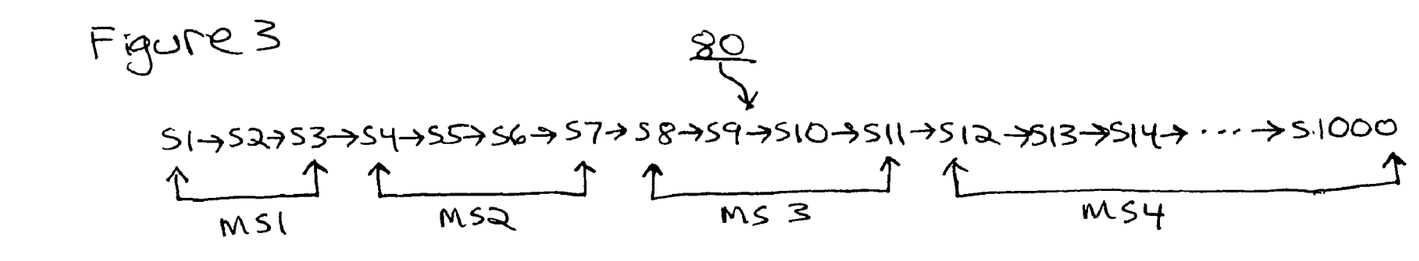
FIG. 3 is a diagram illustrating a sequence of business process states and milestones comprising a business process.

Turning now to FIG. 3, an exemplary ordered group of job or business process states 80 is shown comprising state S1 through state S1000. Some jobs or business processes, for example an order, may comprise either more or fewer job states than the 1000 depicted here.

Figure 4:
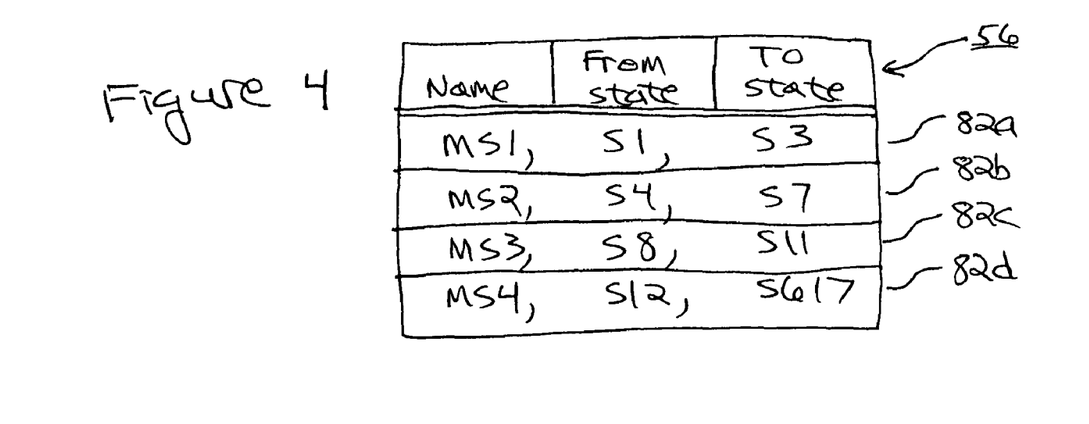
FIG. 4 is a diagram of a milestone definition table schema, containing several rows of exemplary data.

Turning now to FIG. 4, an exemplary MDDT 56 is depicted. The MDDT 56 is shown to comprise four entries, records, or rows each of which define a milestone 82—a first milestone 82a, a second milestone 82b, a third milestone 82c, and a fourth milestone 82d. The first milestone 82a comprises states S1 through S3. The second milestone 82b comprises states S4 through S7. The third milestone 82c comprises states S8 through S11. The fourth milestone 82d comprises states S12 through S1000. Thus, this exemplary job or business process has 1000 distinct stages or states and may be simplified or abstracted to comprise four milestones. The first milestone 82a, for example, may be named "initialization." The second milestone 82b, for example, may be named "processing." The third milestone 82c, for example, may be named "analysis." The fourth milestone 82d, for example, may be named "formatting and output."

The milestones 82 need not be stored in order in the MDDT 56. Two different milestones 82 defined in separate entries, records, or rows of the MDDT 56 may share the same definition. Two milestones 82 defined in separate entries, records, or rows of the MDDT 56 may have overlapping definitions. For example, a fifth milestone 82e may be defined by the entry "MS5, S5, S25" and a sixth milestone 82f may be defined by the entry "MS6, S9, S55", where the ordered triple within quotes correspond to the milestone name, the from-state, and the to-state respectively. In this example, the fifth milestone 82e overlaps the definition of the second milestone 82b, the third milestone 82c, the fourth milestone 82d, and the sixth milestone 82f. In this example, the sixth milestone 82f overlaps the definition of the third milestone 82c, the fourth milestone 82d, and the fifth milestone 82e.

The milestones 82 may be redefined simply by changing the MDDT 56, such as by executing structured query language (SQL) commands, or by other means well known to those skilled in the art, to update the reporting data store 28. Similarly, new milestones 82 may be defined by adding new entries, records, or rows to the MDDT 56, such as by executing SQL commands in the reporting data store 28.

Returning briefly to FIG. 2, the SDDT 58 comprises a plurality of entries, records, or rows each of which contains a milestone identification, a scenario identification, and a scenario element sequence number. By identifying all of the entries in the SDDT 58 which share a common scenario identification, a set of milestones associated with the identified scenario is defined. By ordering these milestones according to the scenario element sequence number, a scenario 92 is defined. The scenario 92 may define a preferred view of the job for displaying a report with the user interface 30.

Figure 5:
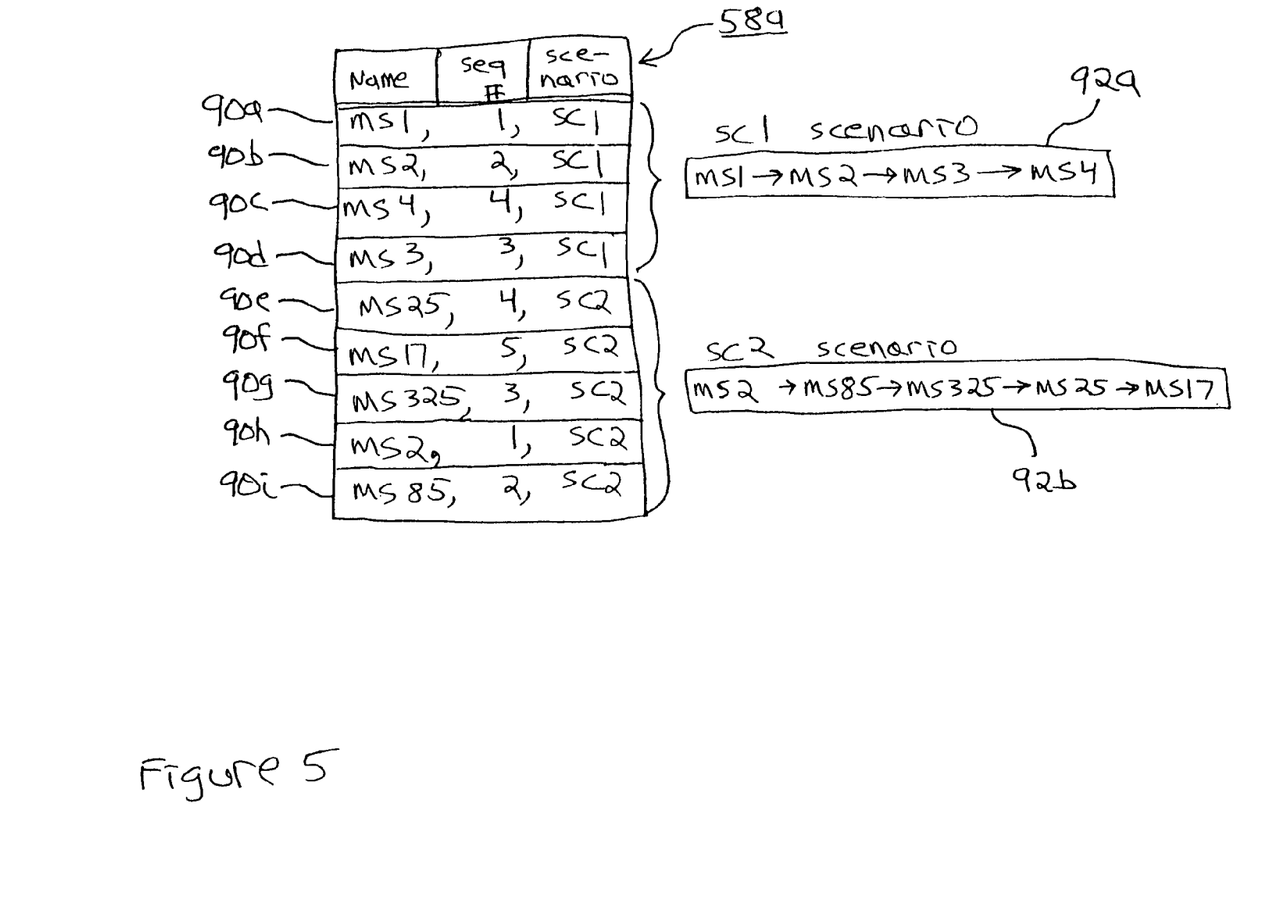
FIG. 5 is a diagram of a scenario definition table schema, containing several rows of exemplary data.

Turning now to FIG. 5, an exemplary SDDT 58a is depicted. The SDDT 58a comprises nine entries, records, or rows—a first SDDT record 90a, a second SDDT record 90b, a third SDDT record 90c, a fourth SDDT record 90d, a fifth SDDT record 90e, a sixth SDDT record 90f, a seventh SDDT record 90g, an eighth SDDT record 90h, and a ninth SDDT record 90i. The SDDT records 90a, 90b, 90c, and 90d define a first scenario 92a. Note that the order of the milestones 82 which comprise the first scenario 92a is determined by the sequence number designated in the corresponding SDDT records 90. The SDDT records 90e, 90f, 90g, 90h, and 90i define a second scenario 92b. Note that the order of the milestones 82 which comprise the second scenario 92b is determined by the sequence number designated in the corresponding SDDT records 90. Note that the second milestone 82b is a constituent of both the first scenario 92a and the second scenario 92b, and hence there are two entries, records, or rows in the SDDT 58*a* identifying the second milestone 82*b*—the second SDDT record 90*b* and the eighth SDDT record 90*h*.

The scenarios 92 may be redefined simply by changing the SDDT 58*a*, such as by executing structured query language (SQL) commands to update the reporting data store 28. Similarly, new scenarios 92 may be defined by adding new entries, records, or rows to the SDDT 58*a*, such as by executing SQL commands, or by other means well known to those skilled in the art, in the reporting data store 28.

Referring also to FIG. 3 and FIG. 4 it will be understood by those skilled in the art, that given the ordered set of job states 80, the MDDT 56 and the SDDT 58*a* can be edited to construct any series scenario 92 providing the full range of abstraction, from highest level to lowest level of abstraction. Furthermore, any scenario 92 whose milestones are arranged in sequence, e.g., in series, can be defined without changing code, by modifying the MDDT 56 and the SDDT 58*a*, for example by executing SQL commands in the reporting data store 28. Providing for scenarios 92 which include parallel or concurrent scenario segments is discussed hereinafter.

Returning briefly to FIG. 2, the milestone mapping procedure 60 aggregates information on jobs or orders based on the definitions of milestones in the MDDT 56. For example, the milestone mapping procedure 60 may determine the number of orders in state S1, state S2, and S3—the three states comprising the first milestone 82*a*—and sum these numbers to represent the number of orders in the first milestone 82*a*. The milestone mapping procedure 60 also performs a roll-up of information contained in the several states associated with each milestone on an order-by-order basis. For example, the milestone mapping procedure 60 may determine that an exemplary order was in state S1 from time T1 to time T2, in state S2 from time T2 to time T3, and in state S3 from time T3 to time T4. The roll-up of this information will capture that the exemplary order was in the first milestone MS1 from time T1 to time T4.

The milestone mapping procedure 60 processes or executes on a periodic basis. In the preferred embodiment, the milestone mapping procedure 60 processes or executes once per day, but in another embodiment a different execution period may be defined. In one embodiment it may be possible for the scenario preprocessing UI 62 to invoke an aperiodic execution of the milestone mapping procedure 60, for example after editing the MDDT 56. The results of the milestone mapping procedure 60 are stored in the first datamart 52*a*. Any earlier changes to the MDDT 56 become visible to the customizable workflow reporter 32 after the milestone mapping procedure 60 executes.

Figure 6:
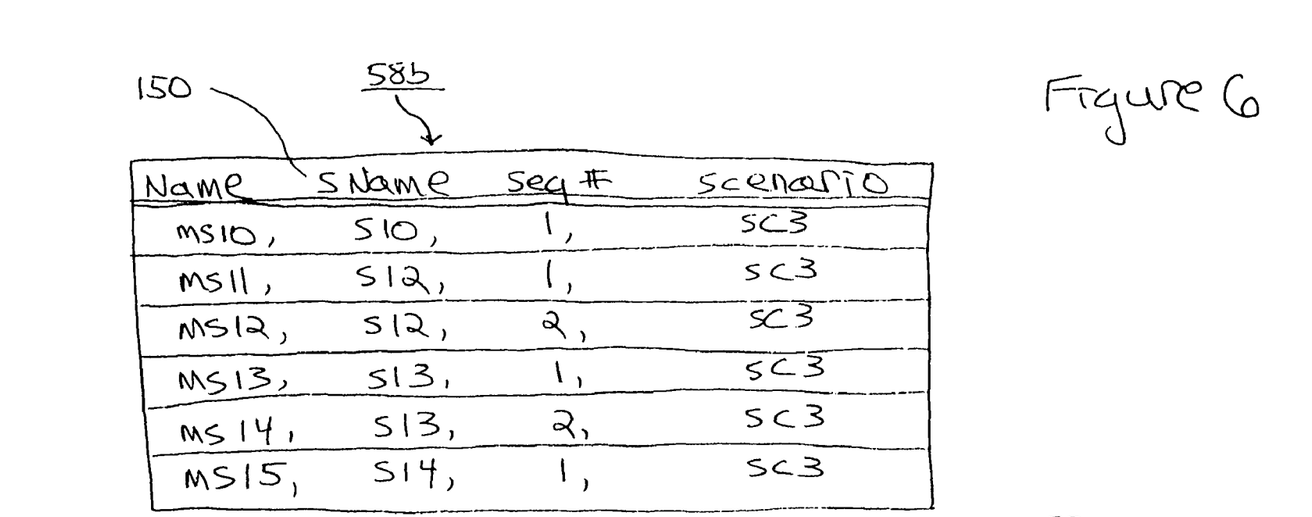
FIG. 6 is a diagram of an alternate embodiment of the scenario definition table schema, containing several rows of exemplary data.

Turning now to FIG. 6, an alternate embodiment of the SDDT 58*b* is depicted. The SDDT 58*b* may be distinguished from the SDDT 58*a* by the addition of a SName field 150. The SName 150 field may be employed to create branching scenario paths, providing for parallel or concurrent scenario segments. The SName 150 field provides for an additional dimension of naming, thereby to provide branching scenario paths. Entries in the SDDT 58*b* having different SName 150 values are associated with different parallel or concurrent scenario segments. The milestones 82 which comprise a parallel or concurrent scenario segment share a common SName 150 value and are ordered relative to one another according to the sequence number.

Figure 7:
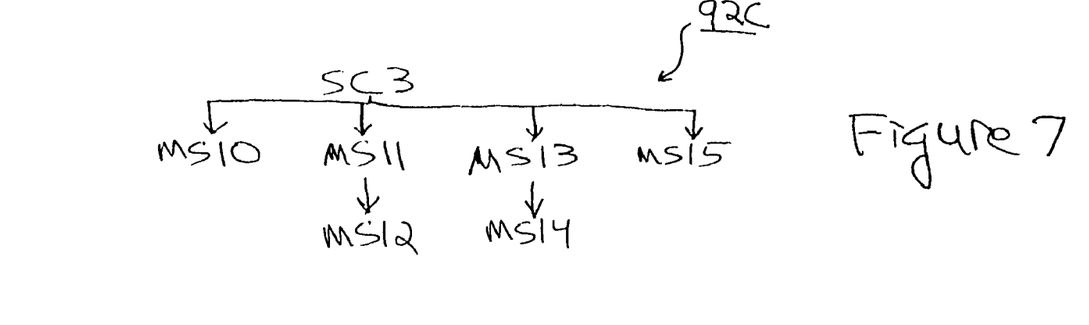
FIG. 7 is a diagram of a representation of a scenario.

Turning to FIG. 7, a scenario 92*c* is depicted that is defined in the exemplary SDDT 58*b* data table shown in FIG. 6. MS10, MS11, MS13, and MS15 are depicted as parallel or concurrent milestones 82 because they share the same sequence number but have different SName 150 values. MS12 is depicted as serial with MS11 because it shares the same SName 150 value with MS11. MS12 is depicted as following MS11 because the sequence number of MS12 is greater than the sequence number of MS11. Similarly, MS14 is depicted as serial with MS13 because it shares the same SName with MS13. MS14 is depicted as following MS13 because the sequence number of MS14 is greater than the sequence number of MS13. In this embodiment, the addition of the SName 150 field supports the definition of complex, multi-branch scenarios 92. As described above, the scenarios 92 may be redefined or new scenarios 92 defined simply by executing SQL commands in the reporting data store 28.

Figure 8:
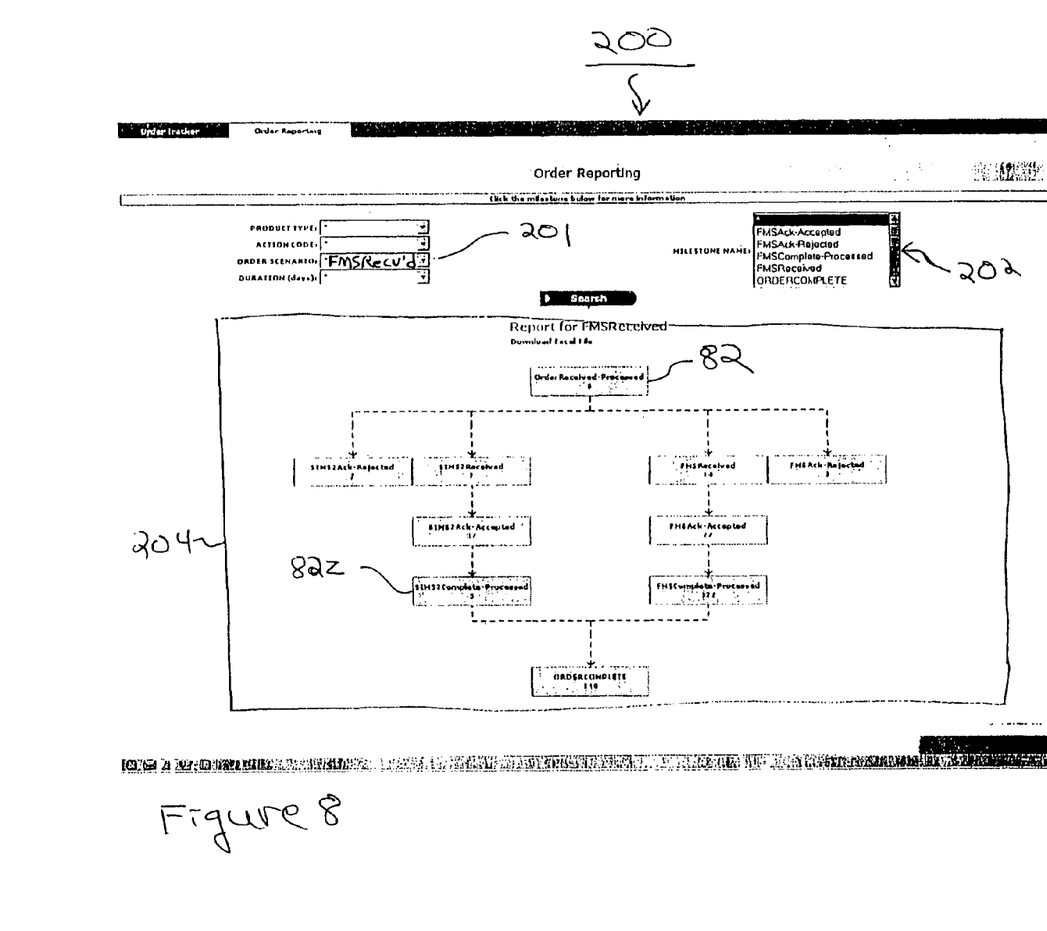
FIG. 8 illustrates a graphical user interface screen having a workflow report view according to one embodiment of the present disclosure.

Turning now to FIG. 8, a report screen 200 which may display on the UI 30 is shown. The scenario 92 is selected using input box 201. A milestone selector box 202 permits selection of all milestones 82 which form part of the selected scenario or selection of specific milestones 82 from those which form part of the selected scenario. The selected milestones 82 are displayed, as boxes, according to SName 150 and sequence number as shown in FIG. 6, in the report frame 204. Each milestone 82 box displays a count of orders which are in the states associated with that milestone 82 by the MDDT 56. For example, five orders are shown to be processing in milestone 82*z*, "SIMS2Complete-Processed." An analyst may quickly determine how processing of the scenario 92 is proceeding by examining the report screen 200. More importantly, if a particular set of defined scenarios 92 does not provide the view of the order processing needed by an analyst, an additional scenario 92 can be generated by defining appropriate milestones 82 in the MDDT 56 and defining the desired scenario 92 in the SDDT 58. Drill-down views, for example a view which exposes finer details of order processes, are readily created by first defining milestones 82 which provide the level of fine detail desired and then defining the scenario 92 which sequences these milestones 82 in the desired order and structure.

The definition of milestones 82 using the MDDT 56, the processing of the milestones 82 by the milestone mapping procedures 60, the definition of the scenarios 92 using the SDDT 58, and the report screen 200, in cooperation with the rest of the system 10, are operable using the customizable workflow reporter 32 provided by the present disclosure. The customizable workflow reporter 32 is easily modifiable which enables improved workflow analysis. The customizable workflow reporter 32 may be used to identify bottlenecks in a workflow and allocate resources to remove the bottleneck, such as deploy additional server systems to process messages and reduce message queue latency for orders.

Figure 9:
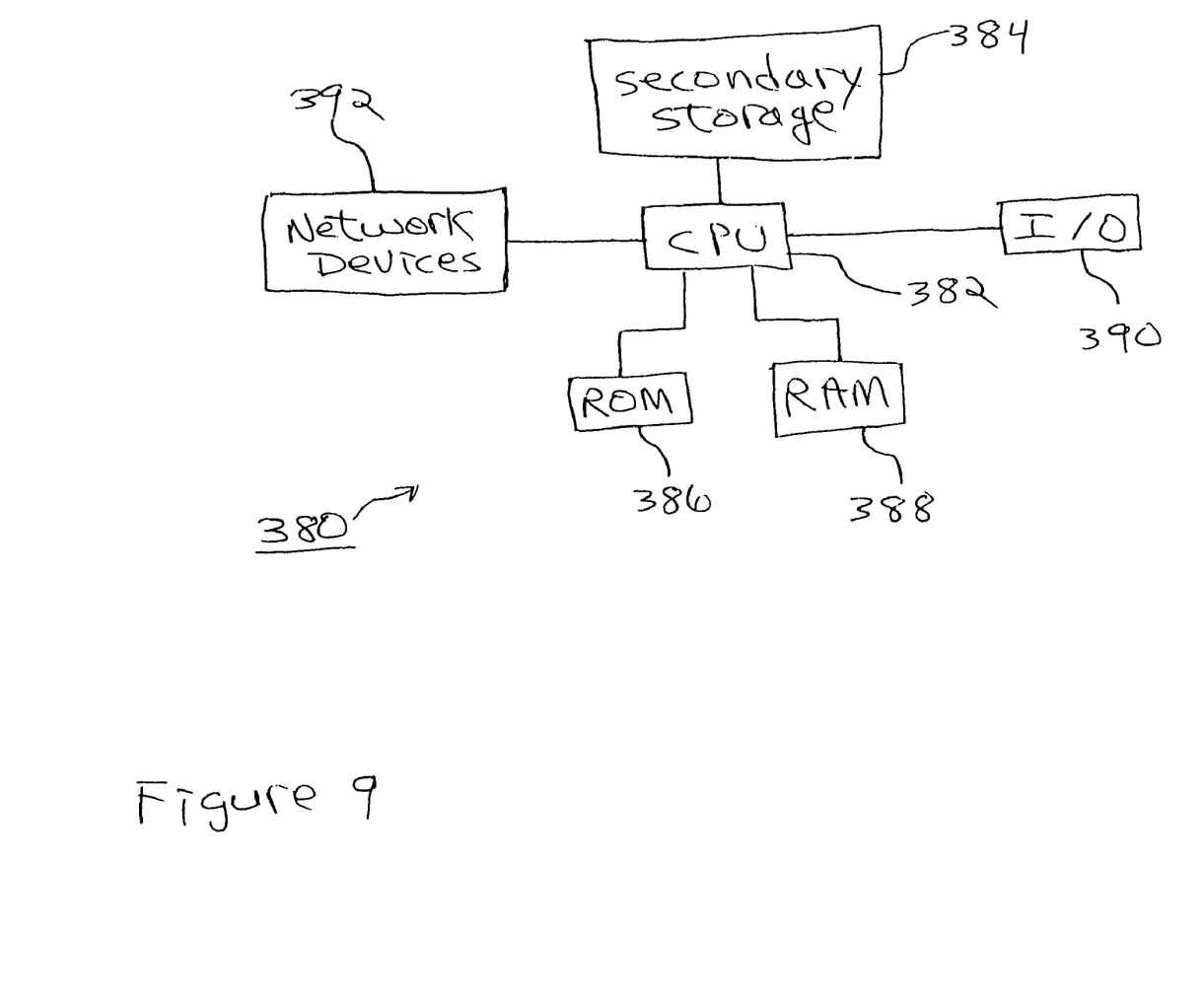
FIG. 9 illustrates an exemplary general purpose computer system suitable for implementing the several embodiments of the disclosure.

The system 10 described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A workflow management system for receiving, tracking, and completing a customer order for goods or services provided by a business, comprising:
   a processor operable to execute computer executable instructions of a workflow manager that coordinates the activities of one or more systems to accomplish a plurality of customer orders for a good or service provided by the business, wherein the workflow manager associates a state with each customer order and updates the state of each customer order as the customer order progresses;
   a secondary storage device configured to store:
      a tracking data store that receives the state of the plurality of customer orders from the workflow manager;
      a reporting data store in communication with the tracking data store and operable to receive from the tracking data store the state of at least some of the plurality of customer orders, the reporting data store maintaining:
         a plurality of milestones, each milestone corresponding to one or more state of the customer orders, each milestone comprising a plurality of order sequence jobs, wherein each milestone is associated with a scenario element sequence number; and
         a plurality of scenarios, each scenario defined as an ordered group of milestones, wherein the scenario and order of the ordered group of milestones is designated by the scenario element sequence number;
   the processor further operable to execute computer executable instructions for:
      processing the state of the plurality of customer orders maintained by the reporting data store according to the plurality of milestones and the plurality of scenarios to provide a summary of customer orders; and
      altering a scenario in response to a change to the scenario element sequence number associated with a milestone.

2. The system of claim 1, wherein the tracking data store receiving the state of each customer order is further defined as receiving an order state information and wherein one or more of the milestones are mapped to one of the scenarios.

3. The system of claim 1, wherein the reporting data store is operable to transform information related to the state of one or more customer orders into scenarios based on user defined rule mapping.

4. The system of claim 3, wherein the reporting data store maintains both order level information and steps of the milestones for each of the scenarios.

5. The system of claim 1, wherein the plurality of customer orders are defined as business process flow between different provisioning applications.

6. The system of claim 1, wherein the workflow manager is defined as a Vitria Workflow Manager.

7. The system of claim 1, wherein the procedure for processing the reporting data store periodically receives an updated copy of the state of at least some of the plurality of customer orders from the tracking data store.

8. The system of claim 7, wherein the period for processing the copy of information about the state of the plurality of customer orders is twenty-four hours.

9. The system of claim 1, wherein the processor is further operable to execute computer executable instructions for processing a copy of the information about the state of the plurality of customer orders executes after the definitions of milestones stored as data are changed.

10. The system of claim 9, wherein the processor is further operable to execute computer executable instructions to identify all changed order state information and remove changed records from the reporting data store, the processor further operable to execute computer executable instructions to add new order state information to the reporting data store.

11. The system of claim 1, wherein each scenario is further defined as an ordered group of milestones, wherein the user interface is a graphical user interface, and wherein displaying the report of customer order progress arranges a plurality of milestone icons according to an order of the milestones.

12. The system of claim 11, wherein the graphical user interface is further operable to display a list of the milestones comprising the selected scenario and further operable to select one or more milestones from the list of the milestones whereby the plurality of milestone icons is limited to selected milestones.

* * * * *